United States Patent [19]

Ebert

[11] Patent Number: 4,576,409
[45] Date of Patent: Mar. 18, 1986

[54] SUN VISOR WITH MOLDED STIFFENING FRAME

[75] Inventor: Charles Ebert, Luxeuil, France

[73] Assignee: Gebr. Happich GmbH, Fed. Rep. of Germany

[21] Appl. No.: 561,051

[22] Filed: Dec. 13, 1983

[30] Foreign Application Priority Data

Dec. 17, 1982 [DE] Fed. Rep. of Germany ....... 3246784

[51] Int. Cl.⁴ ............................................... B60J 3/00
[52] U.S. Cl. ................................. 296/97 H; 296/97 R
[58] Field of Search ................. 296/97 R, 97 H, 97 J, 296/97 K; 160/DIG. 3

[56] References Cited

U.S. PATENT DOCUMENTS

| | | |
|---|---|---|
| 3,716,269 | 2/1973 | Herr et al. |
| 3,751,106 | 8/1973 | Mahler ............................. 296/97 H |
| 4,163,579 | 8/1979 | Mahler ............................. 296/97 H |
| 4,353,591 | 10/1982 | Ceiptschirsch ............... 296/97 R X |

FOREIGN PATENT DOCUMENTS

| | | |
|---|---|---|
| 0035596 | 12/1980 | European Pat. Off. |
| 1187939 | 2/1964 | Fed. Rep. of Germany . |
| 1905369 | 11/1964 | Fed. Rep. of Germany . |
| 1266487 | 4/1968 | Fed. Rep. of Germany . |
| 1955674 | 6/1970 | Fed. Rep. of Germany . |
| 2220711 | 11/1973 | Fed. Rep. of Germany . |
| 7423932 | 10/1974 | Fed. Rep. of Germany . |
| 2521823 | 11/1976 | Fed. Rep. of Germany . |
| 2530111 | 1/1977 | Fed. Rep. of Germany . |
| 7702394 | 1/1977 | Fed. Rep. of Germany . |
| 2742318 | 3/1978 | Fed. Rep. of Germany . |
| 2730926 | 1/1979 | Fed. Rep. of Germany . |
| 2913933 | 10/1979 | Fed. Rep. of Germany ... 296/970 H |
| 3000810 | 7/1981 | Fed. Rep. of Germany . |
| 8121406 | 11/1981 | Fed. Rep. of Germany . |
| 7720922 | 7/1977 | France . |
| 1452220 | 10/1976 | United Kingdom ........... 296/970 H |

Primary Examiner—Robert B. Reeves
Assistant Examiner—Russell D. Stormer
Attorney, Agent, or Firm—Ostrolenk, Faber, Gerb & Soffen

[57] ABSTRACT

A sun visor for an automotive vehicle includes a visor body which is reinforced by an insert in the form of a wire bent into an approximately rectangular frame. A brace for stiffening the rectangular frame is disposed in the area surrounded by the frame. The brace is an injection molding including a longitudinal brace extending to and molded on the short arms of the rectangular insert and a plurality of transverse braces extending to and molded on the long arms of the rectangular insert. One surface of the brace carries a frame for receiving a mirror. Various additional frames are provided on the mirror-receiving frame for holding the mirror in place. A visor body support shaft mounting housing is also molded as part of the brace and is injection molded onto the reinforcing insert. The mounting housing has an opening therein for receiving the support shaft for supporting the visor body. An outer mounting shaft is also molded on the brace for being received in a supporting receiver on the vehicle body.

20 Claims, 6 Drawing Figures

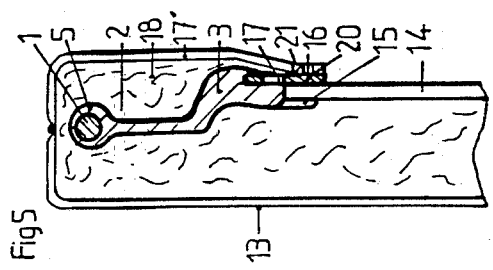
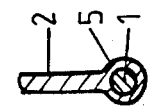
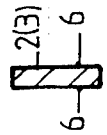
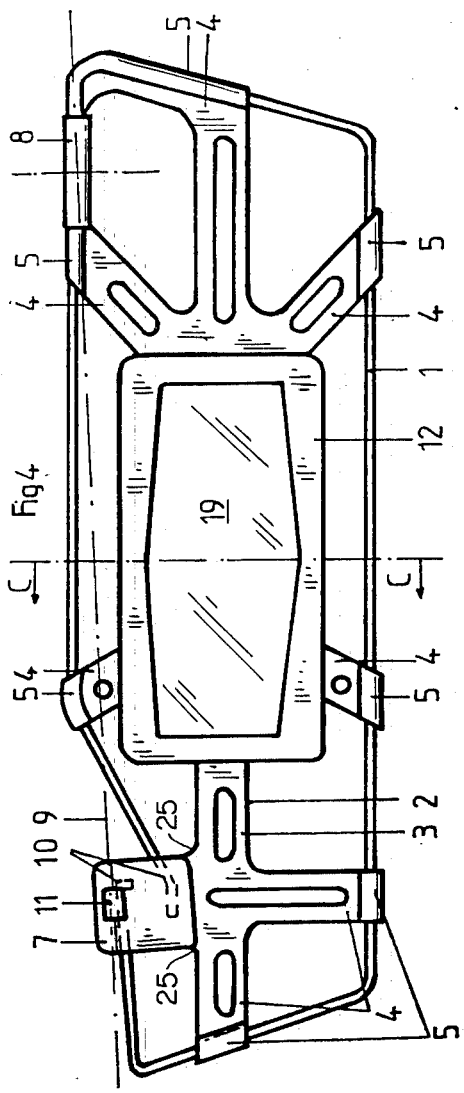
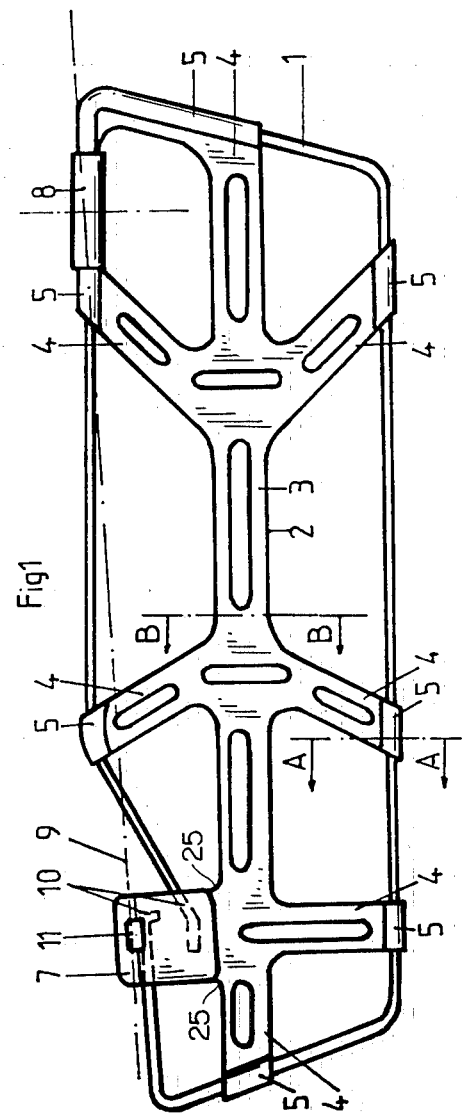

SUN VISOR WITH MOLDED STIFFENING FRAME

BACKGROUND OF THE INVENTION

The invention relates to a sun visor, particularly for automotive vehicles, wherein the sun visor body has a reinforcing insert embedded in it. The insert comprises an elongate strip of thin material, e.g. a wire, which is bent approximately into the shape of a rectangular frame. The invention also relates to a method of manufacturing the sun visor.

German Pat. No. 949,143 describes a sun visor whose body is formed of soft resilient material and in which a reinforcing insert is embedded. The insert consists of a length of wire bent into the shape of an approximately rectangular frame. The sun visors which are now most widely used, at least in Europe, are of that type. However, solid plastic reinforcing inserts for sun visor bodies exist (see, for instance, Federal Republic of Germany Pat. No. 26 33 002). These are used to a substantially smaller extent.

Although sun visors of the type described in German Pat. No. 949,143 have proven excellent, their quality can be improved. The bodies of known sun visors lack stiffness and can become deformed when exposed to high temperatures.

Sun visor bodies in accordance with German Pat. No. 949,143 include an approximately rectangular shaped wire reinforcing frame insert having a visor body mounting housing, which is for receiving a sun visor shaft, arranged at one corner region of the frame insert. The wire frame and mounting housing are seated between two pieces of foam material that are cut to the desired body shape. Each piece of foam material is covered by a foil layer on its outer side. The foil layers are heat sealed to each other around the peripheral edge of the body and form a cover which defines the outer appearance of the sun visor body. It is also intended to hold the parts of the visor body together. The stiffness of this sun visor body is produced exclusively by the wire frame which is embedded in the body near its peripheral edge.

The disadvantage that the sun visor body might become deformed under high temperatures is due to the above-described construction of the sun visor and to the fact that the covering foil may not hold all of the parts of the sun visor body together above certain temperatures which may occur inside the vehicle. The cover foil, which generally consists of PVC, deforms at temperatures above about 80°-90° C. At these temperatures, which may occur within vehicles during the summer, the foil is no longer capable of holding the elements of the sun visor body together.

Furthermore, sun visor bodies are being equipped to an increasing extent with mirrors which are seated in a frame which is fastened to the sun visor cover foil. The weight of the mirror and mirror frame hanging from the cover foil further increases the deformation of that foil at elevated temperatures. When the cover foil does not hold the parts of the visor together, the pieces of foam material of the visor body can easily slip and the sun visor body will thereby permanently deform.

Sun visor bodies are also known in which the wire frame is embedded in or covered with a plastic foam which is of relatively good dimensional stability and which forms the firm sun visor body. This visor body is also covered by a surrounding foil layer. Such sun visor bodies are comparatively expensive and are typically used only for higher priced vehicles.

SUMMARY OF THE INVENTION

Accordingly, the object of the present invention is to improve the stiffness and dimensional stability of a sun visor of the aforementioned type.

Another object of the invention is to improve the stiffness of a sun visor body which is reinforced by a thin strip or wire that extends around the visor body.

According to the invention, at least one brace is provided to stiffen the frame. The brace is located in the area enclosed by the rectangular wire frame which is for reinforcing the sun visor body. The brace has ends which are fastened to the frame around it. The brace has a configuration which extends both longitudinally between the short arms of the rectangular insert and transversely or diagonally to the long arms of the frame. The brace may have a lower substantially flat resting surface which is arranged parallel to the plane of the frame. The opposite upper surface of the brace may also be flat.

The brace improves the stiffness and the stability in shape of the sun visor body, since the shaped pieces of foam material of the body have an additional resting surface within the wire frame onto which they can be bonded by means of an adhesive. The cover foil over the foam pieces is thereby substantially relieved of the task of holding the individual parts of the sun visor body together and the foil need only satisfy its decorative purpose.

The brace preferably comprises a longitudinal brace with ends that are fastened to the short arms of the rectangular wire frame and a plurality of transverse braces with free ends that are fastened to the long arms of the wire frame. The brace is preferably formed of a single piece and preferably consists of a plastic injection molding. When the brace is injection molded, the ends thereof are molded onto the arms of the insert.

Because the brace has a longitudinal brace and several transverse braces, this creates an even substantially larger resting surface for the cut pieces of foam material of the body. This prevents sagging of the pieces of foam material, improves the stiffness of the body and its stability of shape and releases the cover foil from load. Because the brace consists of a single piece and in particular due to its development as a plastic injection molding, the additional cost of including the brace in a sun visor is kept within acceptable limits.

A mirror-receiving frame may be developed as one piece with and of the same material as the brace. The plane of this frame may be offset with respect to the brace and this frame may have a resting surface formed on it for the mirror. The resting surface comprises a peripheral groove or projections which support the mirror at its rear. The cover foil no longer supports the mirror receiving frame and mirror as before, but that mirror receiving frame is now rigidly carried by the wire frame.

In another preferred embodiment of the invention, a supplementary frame is connected to the mirror receiving frame and rests against the viewing side of the mirror and covers its peripheral edge region. The supplementary frame is formed of a material which can be heat-sealed by high frequency radiation. This is of particular importance since it makes it possible to heat seal the cover foil, which has a window-like cross-section in the region of the mirror, directly to the supplementary frame. In this way, however, the brace together with the mirror-receiving frame can be made of a material which, since it need not be heat sealed by means of high frequency or ultrasonic sound or fusion, is particularly low in cost and has a low specific weight. For example, the brace with mirror-receiving frame may be formed of polypropylene and the supplementary frame may be formed of a polycarbonate. Polypropylene is inexpensive, while the substantially more expensive polycarbonate can be heat sealed by high frequency radiation. In this connection, it is furthermore possible to integrally develop a mirror cover flap via a film hinge on the supplementary frame.

The supplementary frame can be embedded in separate regions within the mirror receiving frame by injection molding around it or, alternatively, it can be connected to the mirror receiving frame by interengageable clip elements.

In another preferred embodiment of the invention, the brace is developed as a single piece with, and of the same material as, a mounting housing which is fastened in a corner region of the wire frame and serves for the mounting of the sun visor shaft. In this case, the mounting housing preferably has a spring which is embedded in it by injection molding and the spring presses radially inwardly on the sun visor shaft to brace the visor body. Furthermore, the brace may also advantageously be developed in one piece with, and of the same material as, an outer mounting shaft.

The brace thus serves not only for supporting the frame and for the suitable supporting of the pieces of foam material of the body, but it also combines into a single unit all of the elements of the sun visor body which previously had to be separately manufactured, stocked and mounted.

In accordance with the invention, the ends of the braces, the longitudinal brace and the transverse braces, as well as the mounting housing and the outer mounting shaft, can be injection molded directly on the wire frame, and the corresponding regions of the wire frame being embedded advantageously completely within the plastic material. This is shown in a U.S. application corresponding to a German application No. 561 049, filed of even date herewith and entitled "Sun Visor and Method of Manufacture Thereof". However, it is also possible to manufacture this brace with the elements molded thereon separately and to then attach it by a clip connection to the wire frame.

Illustrative embodiments of the invention will be described below with reference to the accompanying drawings.

BRIEF DESCRIPTION OF THE DRAWINGS

FIG. 1 is a top view of a reinforcing insert, provided with a stiffener, for the sun visor body of a sun visor;

FIG. 2 is a cross-sectional view of a fragment of the insert of FIG. 1, approximately along the line A—A of FIG. 1;

FIG. 3 is a cross-sectional view of another fragment approximately along the line B—B of FIG. 1;

FIG. 4 is a top view of a modified embodiment of a reinforcing insert provided with a stiffener for the body of a sun visor;

FIG. 5 is a cross-sectional view approximately along the line C—C of FIG. 4 in which the reinforcing insert with the cushioned body which encases it and the cover foil surrounding the body are also shown.

DESCRIPTION OF THE PREFERRED EMBODIMENTS

Figure 6:
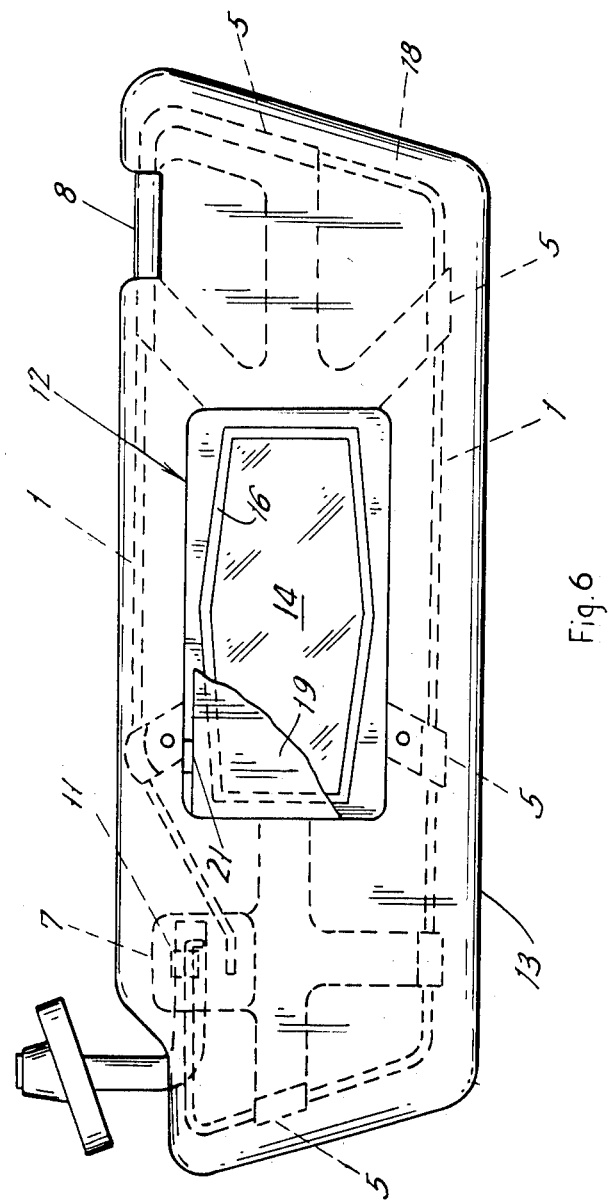
FIG. 6 is an elevational view of a sun visor, showing the reinforcing insert and stiffener enclosed therein.

FIG. 1 shows a reinforcing insert which in intended to stiffen the body of a vehicle sun visor. The insert consists of a length of wire bent into an approximately rectangular frame 1 in a plane.

Within the rectangular space enclosed by the frame, there is a brace 2. This is a plastic injection molding, formed of a longitudinal brace 3 and of a plurality of transverse braces 4 which are formed of the same material and are in one piece with the longitudinal brace. The braces 4 on the left side of FIGS. 1 and 4 form corner regions 25 to assist in positioning a mounting housing 7. To manufacture the reinforcing insert, the frame 1 is placed into the mold cavity of an injection mold. Thereafter, the brace 2 of the longitudinal brace 3 and the shorter transverse braces 4 (compare members 3 and 4 in FIG. 4) are injection molded in such a manner that at their free ends, they form eyes 5 (see FIG. 2) which receive the corresponding section of wire of frame 1.

The brace 2 or the longitudinal brace 3 and the transverse braces 4 have an approximately rectangular cross-sectional profile as can be seen in FIG. 3, whereby upper and lower resting surfaces 6 are formed for the cut pieces of foam material (not shown in FIG. 1) which are rested on the reinforcing insert.

At the left side of FIG. 1, the brace 2 is developed in one piece with, and of the same material as, a mounting housing 7. At the right-hand side of FIG. 1, the brace 2 is also in one piece with, and of the same material as, an outer mounting shaft 8 of the visor. The mounting housing 7 serves to receive the sun visor shaft (not shown), by which the visor is supported in the vehicle, while the outer mounting shaft 8 is received by an outer mounting housing (not shown) in the vehicle in the mounted condition of the sun visor. The sun visor body is then mounted swingably around the axis 9.

The mounting housing 7, the outer mounting shaft 8 and the brace 2 are injection molded directly on the frame 1. Such molding of the mounting housing is disclosed in the above-noted U.S. application. The separated end regions 10 of the frame 1 extend past each other and are preferably embedded within the molded mounting housing 7. The mounting housing 7 also encases a torque spring 11 by being molded around the spring. The spring acts as a brake on the support shaft of the visor.

FIG. 4 shows a modified reinforcement insert, wherein the brace 2 is developed in one piece with and of the same material as a mirror-receiving frame 12 which is arranged in approximately the central region of the frame. Otherwise, the embodiment of FIG. 4 corresponds substantially to that shown in FIGS. 1 to 3 and identical reference numbers have been used for corresponding parts.

The development of the mirror-receiving frame 12 is shown particularly clearly in FIG. 5. The plane of the mirror-receiving frame 12 is offset from that of the brace and the frame 12 is located near the outer surface 13 of the sun visor body. A resting means or surface for the mirror 14 on the mirror-receiving frame 12 is developed. The resting means comprises a circumferential groove or, as shown in FIG. 5, of projections 15 which extend in from the edge of the mirror and support the mirror 14 at its rear side.

FIG. 5 shows that the mirror-receiving frame 12 is equipped with a supplementary frame 16 which surrounds the circumferential edge region of the mirror 14. The supplementary frame 16 can be clipped onto the mirror-receiving frame 12 by respective interengageable clip elements or, as shown in the drawing, can be embedded in a plurality of separate regions within and extending around the mirror-receiving frame 12 by injection molding. Openings 17 in the supplementary frame 16 assure a particularly good anchoring. The supplementary frame 16 includes a simple rectangular cross-sectional profile, and it is comprised of a material which can be heat sealed by high frequency radiation. This makes it possible, on the one hand, to produce the brace 2 together with all of its parts from a cheap thermoplastic or thermosetting material while, on the other hand, it makes it possible to weld to the frame 16 the cover sheet 17' with which the cushioning material 18 resting on the brace is covered. In general, one weld seam 20 surrounding the mirror opening 19 should be sufficient for this, although, of course, it is also possible to provide a second weld seam 21.

A mirror covering flap 19 (shown partially broken away in FIG. 6) for being pivoted open and closed to expose or cover the mirror is hingedly attached to the supplementary frame at an edge of the covering flap by an integral film hinge 21.

To manufacture the sun visor, a length of wire is bent into a planar frame 1 of approximately rectangular shape. This wire frame is then placed in the mold cavity of a plastic injection molding machine (not shown). The mold cavity has recesses shaped for forming the brace 2 and possibly for forming the mounting housing 7, the outer mounting shaft 8, and the mirror-receiving frame 12. Furthermore, the torque spring 11, the mirror 14 and the supplementary frame 16 may be inserted into the mold cavity and be held there by suitable means. After the mold cavity has been closed, the brace 2 with longitudinal brace 3, transverse braces 4, mounting housing 7, outer mounting shaft 8 and mirror-receiving frame 12 are injection molded around the frame regions and insert parts present in the cavity. The unit obtained in this way is provided with foam coverings like 18, preferably with the interposition of an adhesive, and the coverings are thereafter covered in traditional manner with a cover foil which forms the outer surface 13. A sun visor with the appearance of that shown in FIG. 6 is produced.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A sun visor for vehicles, or the like, comprising:
   a generally flat visor body;
   a reinforcing insert embedded in the visor body for reinforcing the visor body against deformation; the insert being in the form of an elongate thin strip extending around the visor body and the insert defining a generally rectangular frame with an area surrounded by the frame; the generally rectangular frame having opposite long arms joined by opposite short arms for defining the generally rectangular shape thereof;
   a frame stiffener for the reinforcing insert, the frame stiffener being a single piece plastic injection molding located in the area surrounded by the frame; the stiffener including a longitudinal brace having opposite ends which are on the opposite short arms of the reinforcing insert and the stiffener also including a plurality of transversely extending braces extending transversely of the longitudinal brace and each also having ends which are on the long arms of the reinforcing insert;
   the ends of the longitudinal brace and of the transverse braces being injection molded directly on the respective arms of the reinforcing insert.

2. The sun visor of claim 1, wherein at least one of the transverse braces extends in a diagonal direction between the longitudinal direction of extension of the longitudinal brace and one of the long arms of the reinforcing insert.

3. The sun visor of claim 1, said sun visor being hingedly mounted at a windshield and having a position where it is stored upwardly out of the path of light through the windshield and in that position has an upper surface and a lower surface wherein the generally rectangular frame of the reinforcing insert is shaped to generally define a plane; the frame stiffener also having opposite upper and lower surfaces parallel to the upper and lower surfaces of the visor, and at least one of these surfaces is generally parallel to the plane of the reinforcing insert frame.

4. The sun visor of claim 3, wherein the frame stiffener has opposite upper and lower surfaces; a mirror receiving frame being defined in the frame stiffener at one surface thereof for supporting a mirror on the frame stiffener.

5. The sun visor of claim 4, wherein the mirror receiving frame is of the same plastic material as the frame stiffener and is one piece with the frame stiffener.

6. The sun visor of claim 4, wherein the mirror receiving frame defines a respective plane which is offset outwardly from said one surface of the frame stiffener.

7. The sun visor of claim 4, further comprising a resting surface for a mirror, the resting surface being defined on the mirror receiving frame.

8. The sun visor of claim 7, wherein the resting surface comprises projections extending inwardly from the mirror receiving frame and the projections being positioned for providing support for the rear of a mirror.

9. The sun visor of claim 7, wherein an inner side of a mirror rests on the resting surface; the visor further comprising a supplementary frame connected to the mirror receiving frame and disposed to be on the other, outer side of a mirror supported at the resting surface, and the supplementary frame being for supporting a mirror at the resting surface.

10. The sun visor of claim 9, wherein the supplementary frame is shaped for covering the circumferential edge regions of a mirror which is supported at the resting surface.

11. The sun visor of claim 10, wherein the supplementary frame is comprised of a material that can be heat sealed by high frequency radiation.

12. The sun visor of claim 9, wherein the supplementary frame is embedded in the mirror-receiving frame at a plurality of separate regions located around the mirror receiving frame.

13. The sun visor of claim 9, further comprising a mirror cover flap for covering the mirror and being hingedly attached to the supplementary frame for being movable selectively to cover and expose a mirror supported on the mirror receiving frame.

14. The sun visor of claim 9, further comprising a visor body mounting housing which is of one piece with and the same material as the frame stiffener; the mounting housing having an opening therein for receiving a support shaft for the visor body; the reinforcing insert having corner regions, and the mounting housing being disposed at one of the corner regions of the reinforcing insert.

15. The sun visor of claim 4, further comprising a visor body mounting housing which is of one piece with and the same material as the frame stiffener; the mounting housing having an opening therein for receiving a support shaft for the visor body; the reinforcing insert having corner regions, and the mounting housing being disposed at one of the corner regions of the reinforcing insert.

16. The sun visor of claim 1, further comprising a visor body mounting housing which is of one piece with and the same material as the frame stiffener; the mounting housing having an opening therein for receiving a support shaft for the visor body; the reinforcing insert having corner regions, and the mounting housing being disposed at one of the corner regions of the reinforcing insert.

17. The sun visor of claim 16, wherein the mounting housing includes a spring which is secured to the mounting housing for engaging a support shaft which is received in the mounting housing opening for the spring to press against the shaft for braking motion of the visor body with respect to the support shaft.

18. The sun visor of claim 16, further comprising an outer mounting shaft which is of one piece with and the same material as the frame stiffener, the outer mounting shaft being mountable to a receiver on the vehicle.

19. The sun visor of claim 1, further comprising an outer mounting shaft which is of one piece with and the same material as the frame stiffener, the outer mounting shaft being mountable to a receiver on the vehicle.

20. The sun visor of claim 14, wherein the ends of the longitudinal brace and of the transverse braces are injection molded directly on the respective arms of the reinforcing insert, and the mounting housing is directly molded on the frame.

* * * * *